United States Patent [19]
Huijsing et al.

[11] Patent Number: 5,604,918
[45] Date of Patent: Feb. 18, 1997

[54] TWO-LINE MIXED ANALOG/DIGITAL BUS SYSTEM AND A MASTER STATION AND A SLAVE STATION FOR USE IN SUCH SYSTEM

[75] Inventors: Johan H. Huijsing, Schipluiden; Roeland F. Tuk, Voorhout; Frank R. Riedijk, Pijnacker; Martinus Bredius; Gerrit Van Der Horn, both of Delft; Herman Schutte, Eindhoven, all of Netherlands

[73] Assignee: U.S. Philips Corporation, New York, N.Y.

[21] Appl. No.: 253,465

[22] Filed: Jun. 3, 1994

[30] Foreign Application Priority Data

Jun. 4, 1993 [EP] European Pat. Off. ............ 93201595

[51] Int. Cl.$^6$ ............................ G06F 13/42; G11B 27/36
[52] U.S. Cl. ........................ 395/892; 395/286; 395/889
[58] Field of Search ..................... 395/550, 500, 395/325, 889, 286, 892, 849

[56] References Cited

U.S. PATENT DOCUMENTS

| | | | |
|---|---|---|---|
| 4,689,740 | 8/1987 | Moelands et al. | 395/550 |
| 4,724,992 | 2/1988 | Kosaka et al. | 358/342 |
| 4,984,190 | 1/1991 | Katori et al. | 395/200 |
| 5,341,131 | 8/1994 | Hoshino et al. | 340/825.31 |
| 5,341,480 | 8/1994 | Wasserman et al. | 395/325 |
| 5,367,563 | 11/1994 | Sainton et al. | 379/98 |

FOREIGN PATENT DOCUMENTS 0051332  5/1982  European Pat. Off. .

*Primary Examiner*—Jack B. Harvey
*Assistant Examiner*—Jeffrey K. Sato
*Attorney, Agent, or Firm*—Steven R. Biren

[57] ABSTRACT

A two-line multi-station bus system has a clock wire and a data wire and supports selective slave station addressing by a prevalent master station for thereupon eliciting a bitwise clocked data transfer between the clocking master station and an addressed and clocked slave station. Moreover, the system supports analog signal transfer in that the prevalent master station has a holding member for while eliciting the analog signal from the actual addressed slave station holding said clocking through carrying the clock wire at a predetermined binary value. The analog signal is received until changeover of the clock wire to a binary value other than the predetermined binary value a particular version the analog signal is pulse width modulated in combination with associate delimiting signals on the clock wire sent by the transmitter station that is not necessarily the master station.

16 Claims, 4 Drawing Sheets

TWO-LINE MIXED ANALOG/DIGITAL BUS SYSTEM AND A MASTER STATION AND A SLAVE STATION FOR USE IN SUCH SYSTEM

BACKGROUND OF THE INVENTION

The invention relates to a two-line multi-station bus system with a clock wire and a data wire, said system supporting selective slave station addressing by a prevalent master station for thereupon eliciting a bitwise clocked data transfer between said clocking master station and an addressed and clocked slave station. Such a system has been described in EP Patent 51332 and corresponding U.S. Pat. No. 4,689,740 (PHN 9873) to the same assignee as the present application, herein incorporated by reference. The reference describes the so-called I2C system that has been designed predominantly for communicating control signals between integrated circuit chips that are located within a single apparatus such as may be intended for, but not limited to consumer entertainment. I2C has gained status as de facto standard.

The present invention intends to extend the field of use of bus systems that are of comparable structure as, but not necessarily identical to the I2C bus, in particular to such applications where both digital and analog signals occur. One field of application is where a slave station may emit a bit stream that in principle may have an infinite length. A particular example of an analog signal is one wherein a slave station is a smart sensor that when addressed emits a sense signal with an analog amplitude or shape. Analog in this context means multivalued to such extent as the receiver can discriminate, such discrimination being generally equal to the discrimination assigned to a signal by a transmitter, although the granularity applied by the receiver may be coarser.

SUMMARY OF THE INVENTION

Accordingly, amongst other things it is an object of the present invention to provide a bus system according to the preamble, wherein simple analog signal generators can be accessed in a straightforward manner without the need for providing each such slave station with an analog-to-digital converter that would represent an unbearable financial overhead.

Now, according to one of its aspects, the invention is characterized in that said system supports analog signal transfer in that said prevalent master station has holding means for while eliciting said analog signal from said actual addressed slave station holding said clocking through carrying said clock wire at a predetermined binary value and has receiving means for then receiving said analog signal until changeover of the clock wire to the other binary value. In this way the addressed slave station may directly send its analog value over the bus. Of course, the actual analog value must fit within a range of allowable values in view of the electric voltage withholding capability, the bandwidth, and other electrical bus specifications. A particular advantage of holding the clock during analog signal transfer is the avoiding of electromagnetic interference. In this way, improved adherence to electromagnetic compatibility (E.M.C.) prescriptions is achieved.

The invention also relates to a master station and to a slave station for use in a system according to the invention. Further advantageous aspects of the invention are recited in dependent claims.

BRIEF DESCRIPTION OF THE DRAWINGS

These and other aspects and advantages of the invention will be discussed in detail with reference to a preferred embodiment that is shown in and by the appended Figures and in particular.

DETAILED DESCRIPTION OF A PREFERRED EMBODIMENT

Figure 1:
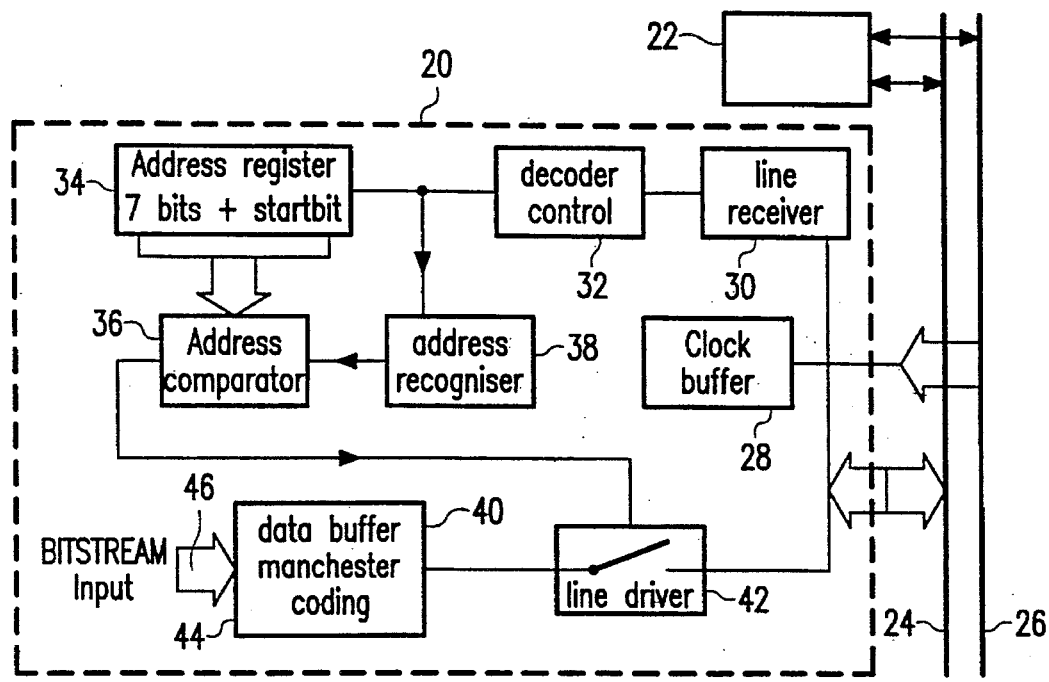
FIG. 1 shows a bus system according to the invention.

For a better insight, first an overall functionality description of the bus system is given. The interface has been simplified as much as possible by putting most of the logic in the bus master station. The bus may have a single master station that defines the clock frequency and may selectively address the slave station or stations. Alternatively, a plurality of master stations may be present, each of which may self-reliantly try to become master of the bus. If there is more than one prospective master, there may be executed an arbitrage operation as based on an address. Usually, this is the master address, although other procedures are feasible; such serial arbitrage may cause a prospective master station with a higher address to relinquish its attempt upon recognizing the first address bit that is non-conforming with an actual bus value. In the latter case, a subsequent retry must be undertaken. Generally, each master station has its own clock generation, although in principle, the externally received clock on the clock wire can be used for synchronization.

The bus master should know what data to expect at a particular address, digital or analog, although in principle, a slave station may produce analog data as well as digital data. The format of the digital data presented by an addressed slave station is unrestricted, thereby allowing transfer of an infinite-length bit stream. An exception is formed by the analog data transfer: in that situation, the master station holds its clocking and keeps the clock line at signal level high, thereby effectively stalling other devices with respect to the bus. A device with ALARM functionality may keep the data line low to interrupt the bus for in this way to request service. In case of actual analog transfer such ALARM functionality necessitates that also the clock is made low. This works as an interrupt, so that the bus master is reactivated for again starting the clock, thereby enabling execution of a service routine. One of various possibilities for executing an interrupt handling procedure is that the interruptor device puts an address, for example, its own address on the bus, in this way causing the master station to gain awareness. Another possibility is that the interrupting device puts a particular code on the data wire for so causing the master to start a search for the interruptor. Generally, the complete data transfer is controlled by a master device, through addressing of a slave station, defining the amount of data, up to infinity, and also to eventually stop the bit stream. For example, if the addressed slave station produces a single byte, the bus is subsequently brought into an idle state. This signals termination of the transport to the master. Another cause for data transfer termination is through interrupt by a third device or through an error condition, such as an accidental stop or idle condition that causes all stations to reset.

From an electrical standpoint, the data wire is pull-down connected through a resistor to the positive voltage terminal. In principle, also the clock wire is pull-down connected; in practice, the clock wire may be hard driven such as through a normal push-pull output instead of through an open collector output stage. Only when alarm signalization during analog data transfer must be supportable, the clock wire may not be hard driven. In particular, the clock edge must be steeper than the data edges. If clock wire and data wire are both open collector lines, the pull-up resistance of the clock line must be appreciably smaller than the pull-up resistance of the data line. Through a small delay connected to the data wire input of the bus interface the clock edge can be made to effectively run a bit ahead of the data edge. It is estimated that a fully functional bus interface needs only 600 transistors, which is fully 40% lower than necessary for I2C interfacing.

Further protocol details are as follows. On idle or stop signalization the interface is automatically reset. Such reset implies that the input address register contains exclusively -ones-, the sel(ected) signalization is made -false-, and the signal Ar (recognize address) may become -false-. Two -idle- signals in succession will activate the address recognizer Ar, meaning that the subsequent data must be processed as an address. If applicable, the address may preceded by more than two -idle-signalizations. The address is headed by a -zero- start bit. a -Nidle- (non-idle) following an -idle- signal will cause resetting, also of signal Ar. Because after resetting the whole address register is filled with logic -ones-, the next -zero- of signalization -sb- operates as start bit, and the remainder of the register will contain the address. After a start bit, the address recognizer is deactivated until reception of the next double -idle- signal. If the address received is correct (i.e. leading to an equality signalization), the output drive routine is activated. If the address received is incorrect, the station in question will wait until a next addressing routine. In all cases the output stage remains active until reception of a -stop- signalization. This cannot occur in combination with an -idle-signalization, because the output stage of the station in question will prevent the data line to remain -1- for a whole clock period. If this would nevertheless occur, then the interface would automatically reset. After the end of a data transfer the interface can reset itself, thereby rendering the bus -idle- again.

FIG. 1 shows a bus system according to the invention, wherein for clarity the number of stations has been limited to only stations 20, 22. In practice, the number of stations may be much higher. Usually, there are four different station categories: master transmitter, master receiver, slave transmitter and slave receiver station. The master controls the transfer operation, such as by synchronizing, addressing, and indicating the transfer direction. The slave is controlled by the master for executing its part of the transmission. The transmitter produces the actual information. The receiver takes up this information. Now, the two-line bus has clock line 26 and data line 24, that in general will be galvanic wires, although interposition of other interconnection technologies such as optical is feasible. In particular, station 20 has been detailed on block diagram level. First, clock buffer 28 receives clock pulses from line 26. The remaining subsystems shown connect directly or indirectly to the data wire. Block 30 is a line receiver that receives the elements of an incoming bit stream from line 24. Block 32 effects decoding of the incoming data bit string and will extract therefrom such control signals as are necessary for controlling the remaining subsystems in FIG. 1. Block 38 is an address detector that detects whether the incoming bit stream represents an address information or other information. Block 36 is an address recognizer that recognizes an actual "own" address of the station in question, and if necessary, further addresses such as for example a broadcast address that is common to all stations. The address to be recognized is shifted from blocks 30/32 into register 34 that accommodates seven bits plus a start bit. Upon detection of equality, the address comparator sends an activation signal to switch 42 that may through appropriate features constitute a line driver. The data source is represented by input 46 that leads to data buffer 44. The encoding may be in the well-known Manchester coding. The station as shown may have either slave station functionality or master station functionality, inasmuch as only the bus interface has been shown. If slave, appropriate source mechanism for data generation must be provided, with respect to input 46. Alternatively, the signal produced is analog; this means that either Manchester coding 40 is passed roundabout, or is absent. Line driver 42 may have multiplexing functionality that may be activated by the detection of the clock withholding as detectable by clock buffer 28. If master, clock generation and data/address/control generation for data line 24 may be provided, such as in the general manner that is known from the I2C reference. If receiver, information destination functionality may follow I2C technology as well. It is known that transmitter/receiver functionality may by itself interchange during one dialogue. For simplicity, station 22 has not been detailed further.

Figure 2A:
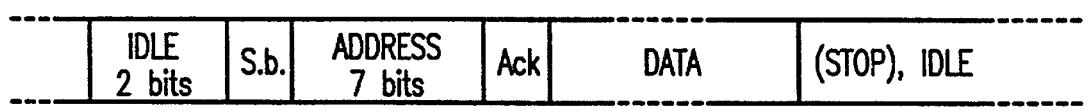
FIGS. 2A, 2B show a message format.
Figure 2B:
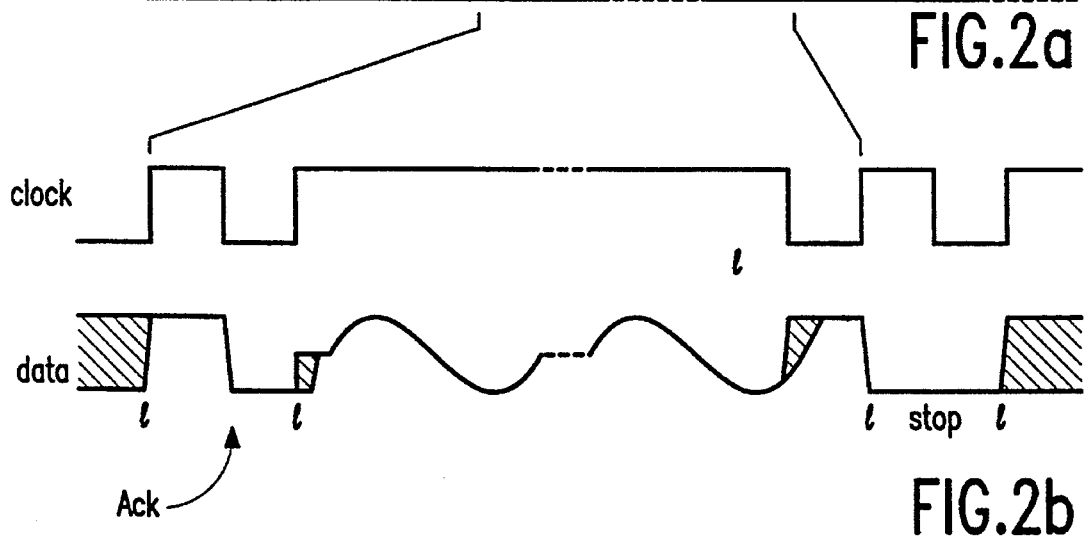

FIGS. 2A, 2B show a message format according to the invention. First, the bit format has not been specified here but will be discussed later on. FIG. 2A shows the message format for an all-digital transfer. The message starts with a two-bit-idle-signalization. Next, a single start bit S.b. is presented. Next, a seven bit address is presented. Next, a time space is produced for reception of a slave-generated-acknowledge-signalization. Next a data interval is shown. Finally a time space for signalling -idle-, and if applicable, -stop-, has been indicated. FIG. 2B shows an extension of FIG. 2A for use with analog data transfer. Here, the digital bit cell may be dimensioned according to the I2C protocol, which is not further discussed for brevity. Now, the left part of the data trace relates to the transmission of the digital address data. Next, the slave station may transmit an acknowledgement signalization within the first half of a full clock pulse period, -1- indicating the leading edge. After a full clock period, the clock again rises and stays at the higher level so attained. This releases the data wire for the transport of analog data that has been shown as a meandering trace. The meaning of the data may be arbitrary, inasmuch as it may be a DC voltage, a periodical phenomenon, or an arbitrary wave, such as for example, telephone speech or some other sensor-generated transient. Finally, when the clock wire goes down again, the next rising clock pulse edge signals termination of the analog intermezzo, the interval between two contiguous rising clock pulse edges indicating a stop signalization, in accordance with the traces of FIG. 2A.

Figure 3:
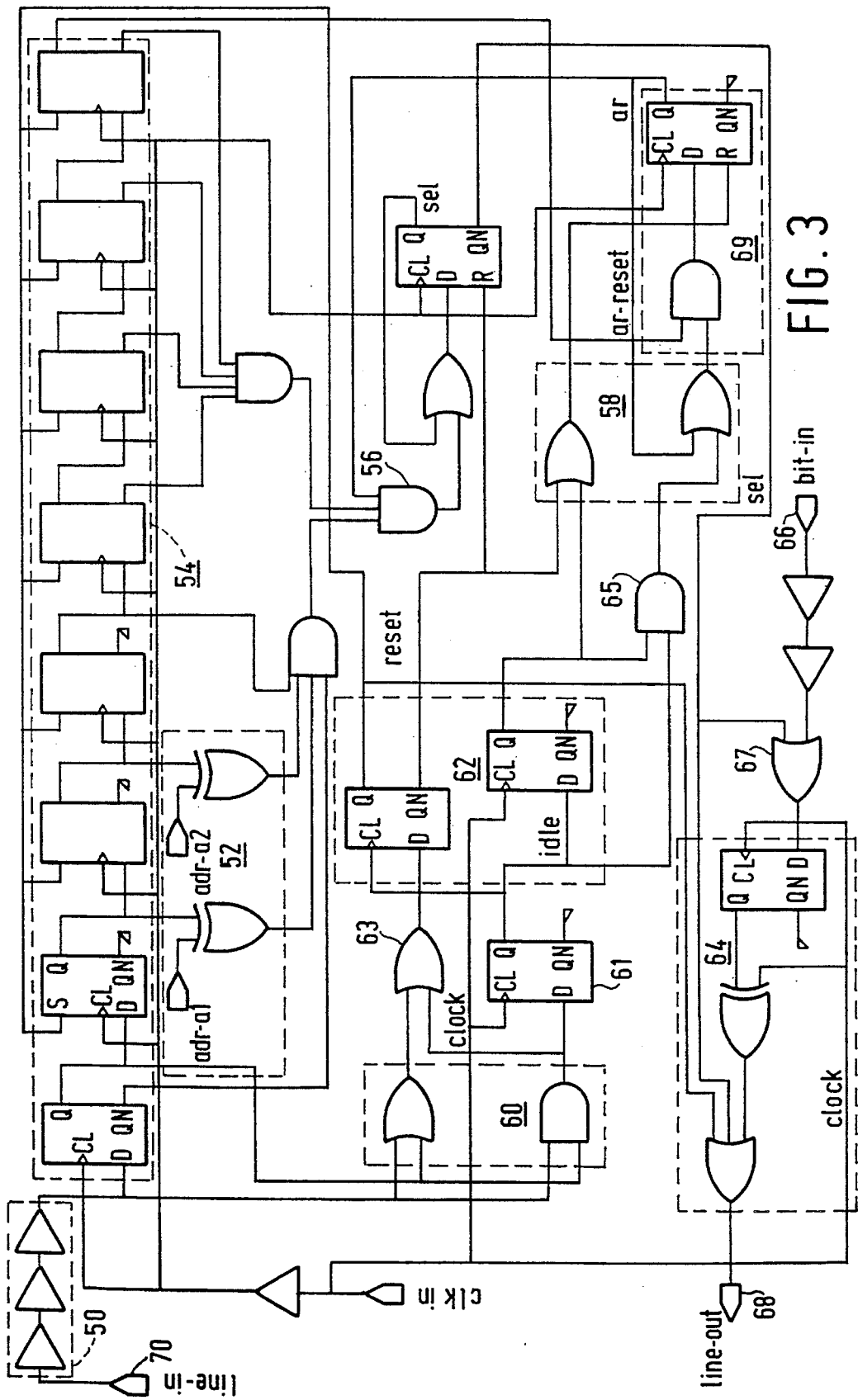
FIG. 3 shows station hardware for bus attachment.

FIG. 3 shows station hardware for bus attachment. Generally, all hardware are standard circuit elements. Numeral 66 indicates the data input, that is connected to a user device associated to the station in question, but which has not been shown for brevity. The data is shown being briefly delayed by buffers and transmission to the bus can be blocked by an OR-gate 67. Next, a D-flipflop and an EXOR-gate at provide Manchester encoding that is well known to persons skilled in the art of data transmission. A further OR-gate allows superposing of signals to the data wire output at numeral 68. Primary station clock is at the clock input of 64's flipflop. Numeral 68 is connected to the control electrode of a transistor, not shown, that has one main electrode connected to ground and the other main electrode driving the data wire, which as discussed supra is resistor pulled-up. The data wire input is at numeral 70, with three buffers at 50 providing adequate delay as explained supra. The data feed an eight bit shift register 54, of which the second and third bit stages feed an address comparator 52 that consists of EXOR-gates. The other inputs of these gates are fed by adjustable but stationary address bits. In this particular case, first and fourth bits of the shift registers feed an AND-gate, as well as fifth to eighth bits. The latter two AND-gate are in turn ANDed in the remainder of the address comparator at 56. Via an OR-gate the recognition is stored as signal -sel- in a retro-coupled data flipflop until resetting thereof.

The station, once selected (sel), unblocks the output OR-gate at 64, provided that the third input of this OR-gate is low. At 60, an OR-gate and an AND-gate constitute a decoder. The AND-gate detects two successive 1-bits received and sets flipflop 61, signalling -idle-. Both AND-gate and OR-gate, via an OR-gate at 63, set a flipflop at 62 that in its turn resets the whole input shift register. The flipflop at 61 sets a second flipflop at 62, the latter two being ANDed at 65. At 58 the final address recognition is effected. The -idle- signal and the start bit are ANDed in 69 for setting the ar flipflop at 69 which subsequently is kept set through a feedback. Resetting on the other hand, is through the reset signal from the upper flipflop at 62. The arrangement of FIG. 3 thus allows for address recognition and data outputting. It represents thus a slave that has digital output. For analog output, line 68 is fed by a multiplexer that is controlled as briefly discussed with reference to FIG. 1. For operating as master, the data output may have again the master functionality known from I2C technology. For slave receiver, again the functionality of I2C as referenced may imported into this arrangement.

Figure 4:
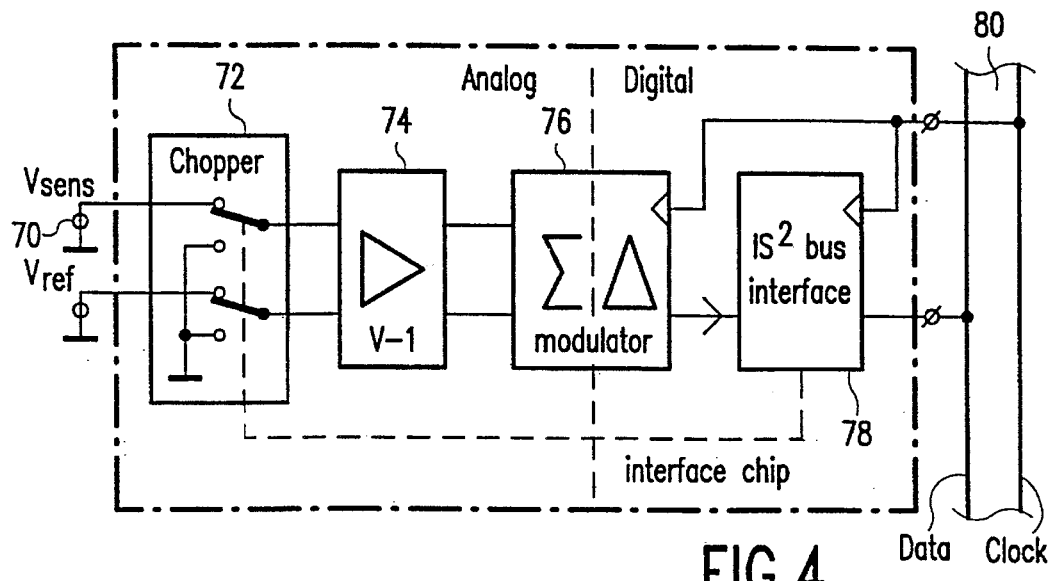
FIG. 4 shows a smart sensor station.

FIG. 4 is an elementary block diagram of a smart sensor station. The sensor by way of example is a thermopile for sensing the temperature, incorporating a Sigma-Delta AD convertor. The bus distributes a central clock for all devices or stations. In this way no synchronization problems remain and separate clocks are superfluous. With Manchester coding, the four different signals in a clock period allow for handshaking and simple error checks. The Manchester coding block contains a one-bit-buffer to insert the acknowledge bit. When the data line is pulled down in a stop condition or becomes idle the interface resets itself.

As regards the thermopile proper, first the sensing signal 70 is time-chopped in a way known for this type of small signals at 72. Next, a V-I differential amplifier 74 is provided. A known sigma-delta modulator 76 converts the signal into a digital bit stream, the bit sequence and distance representing the actual signal values. IS$^2$ bus interface 78 allows to put this bit stream on the data wire of the two wire IS$^2$ bus 80. In this realization, the output of the station is a bit string of a priori unlimited length. In another realization, the bus data emanated from the slave is full analog. Still another one would be mixed, needing some multiplexed output feature that for brevity has not been detailed to the gate level.

Two thermopiles are useful to achieve relative temperature measuring. To obtain higher performance the configuration is balanced. Accuracy of 14 bit was reached. The input offset is reduced to 5 µV with the input chopper. The processor can subtract the offset from the measurement. This is realized by using the LSB of the address to control the chopper. The bus interface supports a 100 kHz clock. The pull-up resistor on the data line is 3.3 kHz, total capacitance is always lower than 330 pF.

Figure 5:
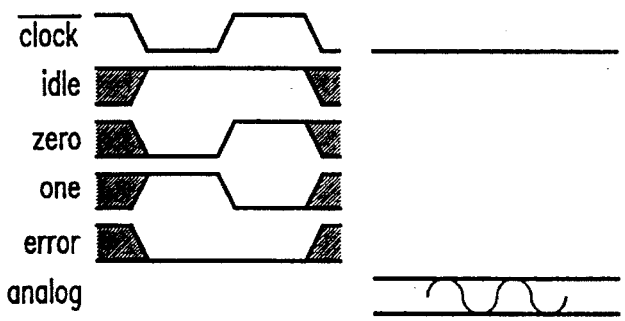
FIG. 5 shows the Manchester encoding format.

FIG. 5 shows the Manchester encoding format confronted with the inverted (as shown by superstrike) clock signal. Two data values and two control signals -idle- and -error- are shown. Also an analog signal is shown. Various useful applications of these two control signals are obvious from the foregoing.

Figure 6:
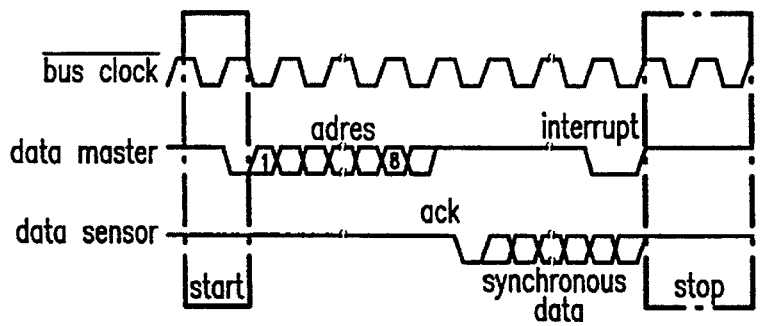
FIG. 6 shows a synchronous data transfer.

FIG. 6 summarily shows the synchronous data transfer protocol, again confronted with the inverted clock. In this realization, the exact prescriptions of the I$^2$C protocol have been used as far as applicable. In particular, the start condition as imposed by the master station, the addressing by the master and the data output by the slave are shown. At far right, an interrupt on the data line stops the transmitting slave.

Figure 7:
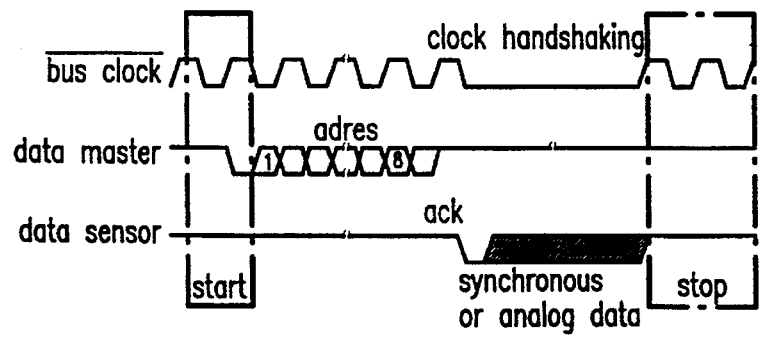
FIG. 7 shows an asynchronous data transfer.

Likewise, FIG. 7 summarily shows the asynchronous data transfer protocol, again confronted with the inverted clock. Notably during asynchronous or analog data, the clock handshaking signal is high, and the inverted clock signal is low, in consequence. The primary difference with FIG. 6 is the holding of the clock signal during slave transmission and the terminating of this transmission upon restarting of the clock pulse train.

Figure 8:
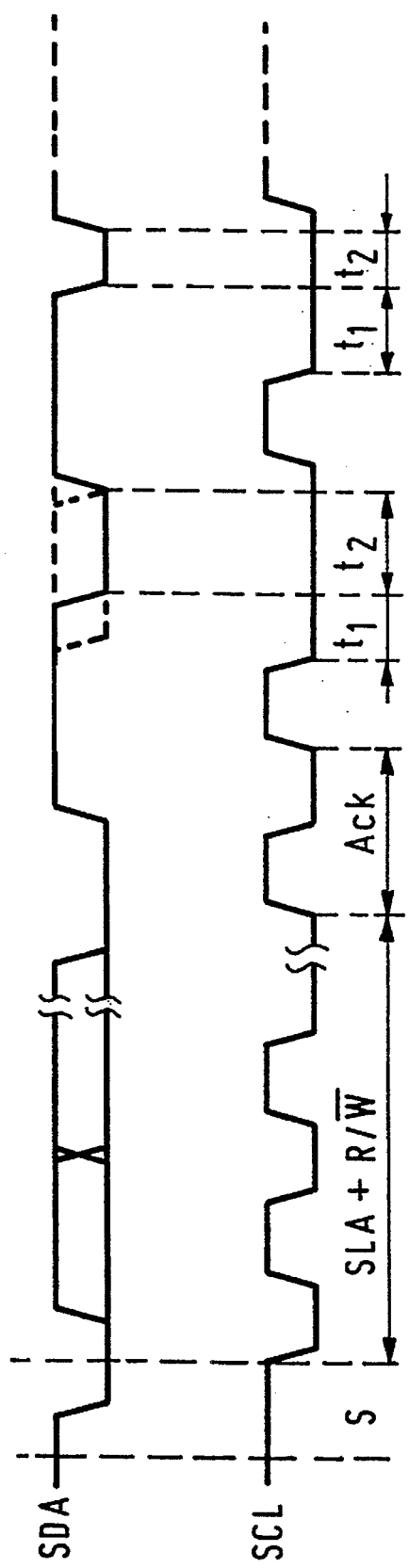
FIG. 8 shows a PWM coded transfer.

FIG. 8 shows a PWM (Pulse Width Modulated) transfer, for coding analog values. The prime advantage thereof is better adaptation to presently standardized I2C protocol. In the Figure, the upper trace shows the signal on the data line SDA. The lower trace shows the signal on the clock line SCL. At left, first the start condition and the slave addressing cum read/write control of the slave are shown, and also an acknowledge interval. Next, a sequence of slave-defined analog signals are shown, during stretched clock intervals as defined by the transmitting, that may be the slave as well as the master in the preceding interval. By itself, the length of the latter intervals is determined by appropriate data rate and time granularity of the information. The analog value may be defined, for example as t1/(t1+t2) giving a ratio from about 0,01 to about 0,99. Other definitions of the value may be determined by the envisaged application. For each stretched clock pulse on SCL a new or repeated value may be transmitted. Repetition, such as 8 times during one byte would be useful for CAT (Computer Averaged Transient) applications. In case of discrete (but analog) transmissions the latter format is less sensitive against interferences.

What is claimed is:

1. A two-wire multi-station bus system comprising:

a clock wire and a data wire;

at least one slave station, each slave station having a slave clock terminal connected to the clock wire and a slave data terminal connected to the data wire, address recognition means for recognizing a digital slave address pertaining to an associated slave station, and analog data generating means connected to the slave data terminal;

at least one master station having a master clock terminal connected to the clock wire and a master data terminal connected to the data wire, clock signal generating means and clock signal control means connected to the master clock terminal, and digital address generating means and analog signal receiving means connected to the master station data terminal;

said master station having master station control means for generating said digital slave address under synchronization by clock signals generated on said master clock terminal, followed by a finite interval of time wherein said clock signal control means control a binary hold signal on said clock wire, while enabling said analog signal receiving means; and said slave station having slave station control means for, under control of said digital slave address received on said slave station terminal and said binary hold signal received on said slave station clock terminal, enabling said analog data generating means until detecting termination of said finite interval as represented by said binary hold signal.

2. The two-wire multi-station bus system of claim 1, wherein said clock signal control means holds said clock wire at a predetermined binary value during analog signal transfer.

3. The two-wire multi-station bus system of claim 1, wherein said clock signal control means holds said clock wire through pullup of said clock wire at a predetermined binary value during analog signal transfer.

4. The two-wire multi-station bus system of claim 3, wherein said data terminal is coupled to receiving means for receiving an analog signal in the form of a pulse width modulated signal on said data wire.

5. The two-wire multi-station bus system of claim 4, wherein said system further supports analog signal transfer from said at least one master station to said at least one slave station, said at least one master station having means for simultaneously transmitting a signal on the clock wire that indicates the signal transfer is occurring and transmitting a pulse width modulated signal on the data wire.

6. The two-wire multi-station bus system of claim 1, wherein said at least one master station includes receiving means for receiving an unlimited length bit stream from said at least one slave station.

7. The two-wire multi-station bus system of claim 1, said at least one master station being a plurality of master stations, and said system including an arbitration means for, upon collision of multiple prospective bus master stations, executing an address based arbitration thereamong for subsequently producing an exclusive actual master station.

8. A master station for use in a two-line multi-station bus system including a data bus, a clock bus and a plurality of slave stations, comprising a clock terminal coupled to said clock bus, a data terminal coupled to said data bus, means for addressing said plurality of slave stations over said clock bus and means for controlling said clock signal, said master station data terminal adapted to provide digital data and analog signal transfer, wherein analog signal transfer occurs when said master station addresses one of said slave stations and said controlling means holds said clock bus until said master station terminates signal transfer by terminating the holding of the clock bus.

9. The master station of claim 8, wherein said controlling means holds said clock bus at a predetermined binary value during said analog signal transfer.

10. The master station of claim 8, wherein said controlling means holds said clock bus through pullup of said clock bus at a predetermined binary value during said analog signal transfer.

11. The master station of claim 10, wherein said data terminal is coupled to receiving means for receiving said analog signal in the form of a pulse width modulated signal on said data bus.

12. The master station of claim 11, said master station having means for simultaneously transmitting a signal on the clock bus that indicates that a signal is being transferred and transmitting a pulse width modulated signal on the data bus.

13. A slave station for use in a two-line multi-station bus system including a data bus, a clock bus and a master station, comprising a clock terminal coupled to said clock bus, a data terminal coupled to said data bus and slave station address detector means for detecting the presence of a predetermined address and responding by producing a bitwise clocked data stream on said data bus, and clock holding detector means for detecting a clock hold condition on said clock bus through pullup of said clock bus to a predetermined binary value and transmitting means for then transmitting an analog signal on said data bus until said clock bus is changed from the predetermined binary value.

14. The slave station of claim 13 including an interface coupled to the data terminal and interface reset means for upon receiving an idle or stop signal on its data terminal resetting its interface.

15. The slave station of claim 14 including activation means for upon receipt of two successive idle signals on its data terminal activating its address detector means.

16. The master station of claim 15, wherein said interface reset means upon receiving an idle followed by a non-idle signal on its data terminal resets its interface inclusive of its address detector means.

* * * * *